Figure 6:
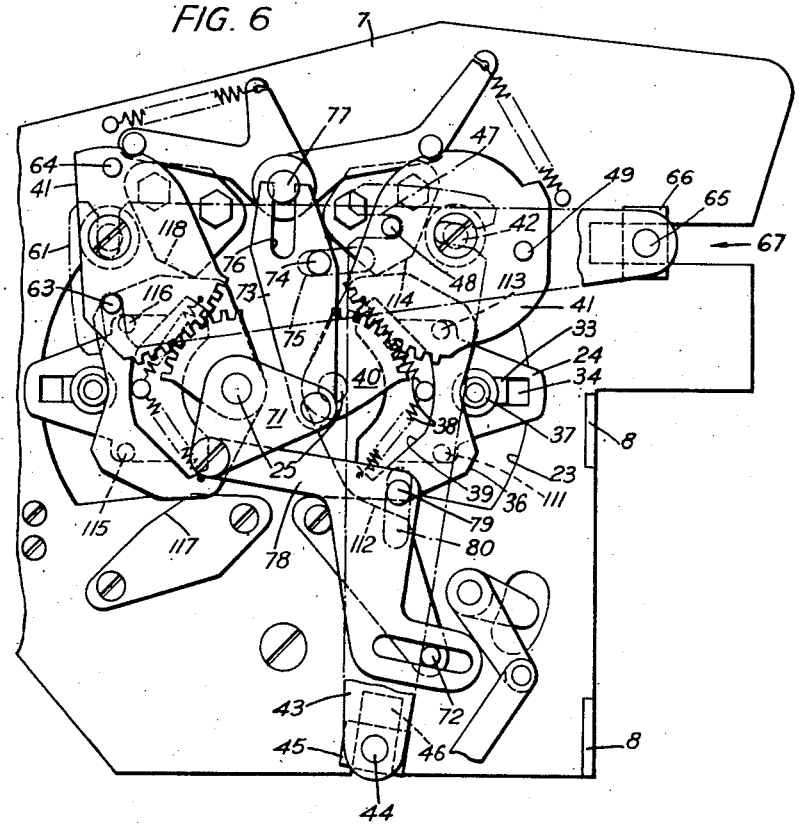

June 4, 1957     A. W. EXCELL     2,794,592
ACCUMULATOR MECHANISM
Filed May 19, 1954     5 Sheets-Sheet 1
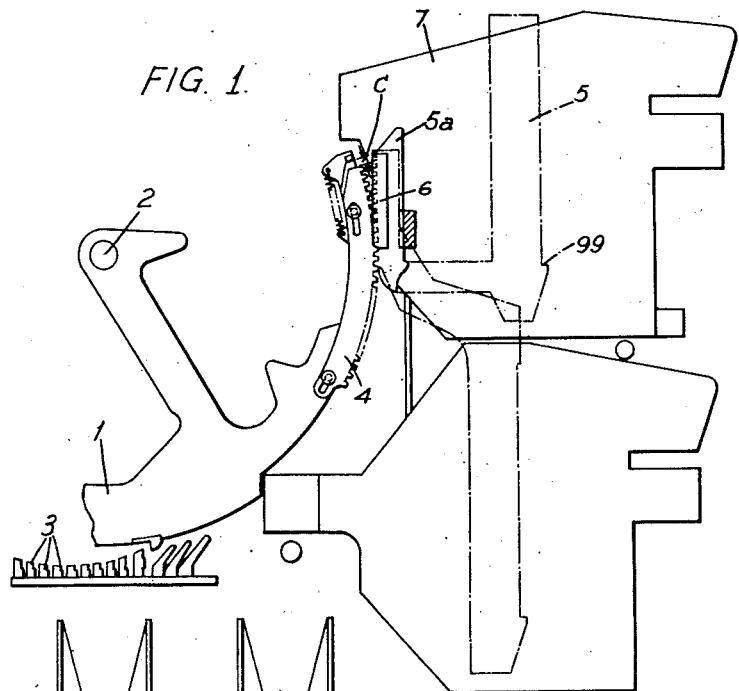
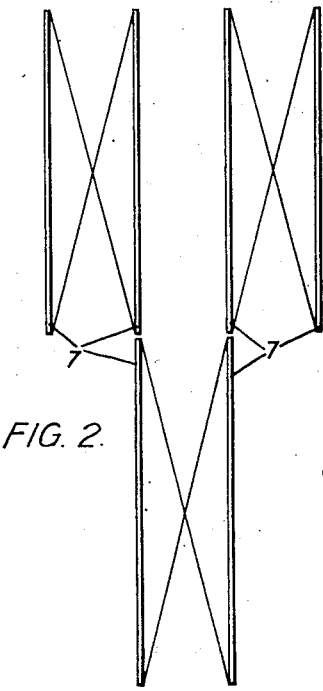
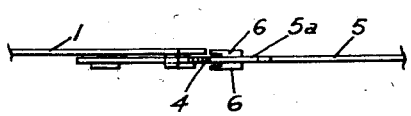
Inventor
ARTHUR W. EXCELL

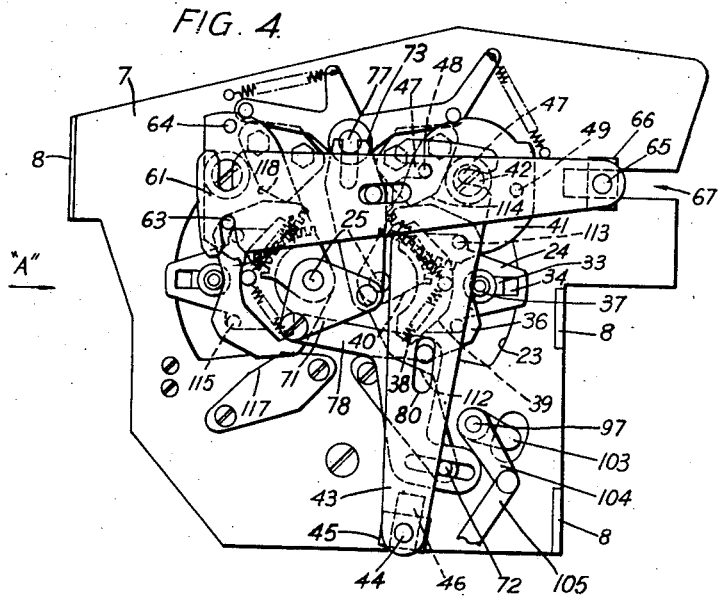

Inventor
ARTHUR W. EXCELL
By

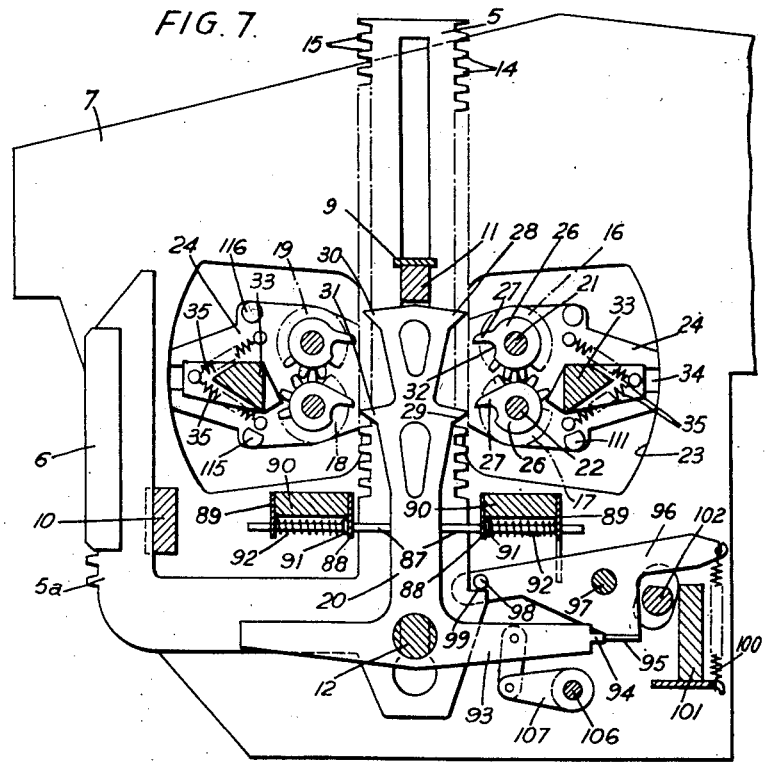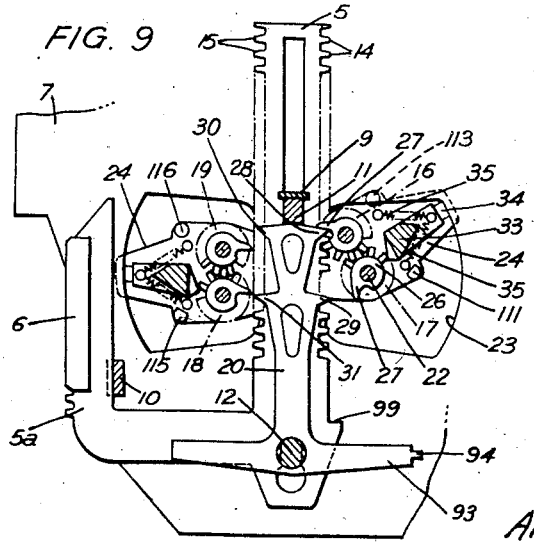

June 4, 1957  A. W. EXCELL  2,794,592
ACCUMULATOR MECHANISM
Filed May 19, 1954  5 Sheets-Sheet 5

Inventor
ARTHUR W. EXCELL
By
Attorney

United States Patent Office 2,794,592
Patented June 4, 1957

2,794,592
ACCUMULATOR MECHANISM

Arthur William Excell, Thornton Heath, England, assignor to Powers-Samas Accounting Machines Limited, London, England, a British company Application May 19, 1954, Serial No. 430,929

Claims priority, application Great Britain May 26, 1953

7 Claims. (Cl. 235—60)

This invention relates to improvements in accumulator mechanism for record card controlled and other calculating machines.

In record card controlled and other calculating machines it has heretofore been proposed to provide accumulator mechanism, in which amounts are registered by toothed counter wheels, including a sub-total accumulator and a grand-total accumulator each of which is operable to perform the function of addition and subtraction and from which there can be read respectively correct positive or negative sub- or grand-totals, the grand-totals being obtained by the transfer thereto of sub-totals from the sub-total accumulator. When, however, such accumulators are employed in a tabulating machine it has, due to the construction of the accumulators, been necessary to fit the sub-total accumulators at the front of the machine and the grand-total accumulators at the rear of the machine, or vice versa, and it has not been possible to arrange the accumulators in a manner such as to accommodate all the available printing elements incorporated in the machine. For example, in one well known form of tabulator because of the nature of the accumulators it has not heretofore been possible to arrange two adjacent sub-total accumulators with a space therebetween of less than six card columns.

It is one object of the present invention to provide an accumulator mechanism the construction of which is such that, if desired, accumulator units can be so disposed as to accommodate all available printing elements as above mentioned.

A further object of the present invention is to provide an accumulator unit which embodies as an integral unit a sub-total and a grand-total register each capable of performing the function of addition or subtraction and in which a sub-total can be transferred, when desired, from the sub-total register to the grand-total register.

According to the present invention accumulator mechanism for record card controlled and other calculating machines comprises racks having teeth along opposite sides thereof and each supported for lengthwise movement by co-operation with a toothed denominational member, a sub-total register and a grand-total register to co-operate respectively with the opposite sides of the racks and each including for each rack a toothed adding wheel and a toothed subtraction wheel, spindles common to the adding wheels and subtraction wheels of each register and by which the wheels are supported to be freely rotatable and permanently in mesh with each other, a rocking carriage for the spindles of each register normally to retain the wheels disengaged from the racks but to permit the adding or the subtraction wheels of the register to be moved into mesh with the racks, operating means co-operating with said carriages to determine whether the adding or the subtraction wheels of a register are to be meshed with the racks and selectively operable to move the selected wheels into mesh with the racks, and carry mechanism including a carry cam movable with a registering wheel and a carry pawl common to the adding and subtraction wheels of a denomination of each of the registers.

In order that the invention may be clearly understood one embodiment thereof will now be described by way of example, with reference to the accompanying diagrammatic drawings, in which:

Fig. 1 is a diagrammatic end view of a part of a tabulating machine having accumulator units according to the invention fitted thereto, Fig. 2 is a diagrammatic view illustrating the manner in which the accumulator units can be disposed to avoid omission of printing elements, Fig. 3 is a plan of a part of the mechanism shown in Fig. 1, Fig. 4 is an end view of an accumulator unit according to the invention, Fig. 5 is an elevation of Fig. 4 looking in the direction of arrow "A,"

Figure 13:
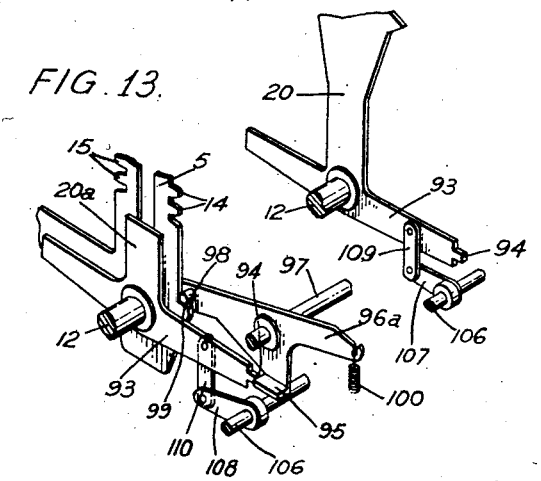
Figure 8:
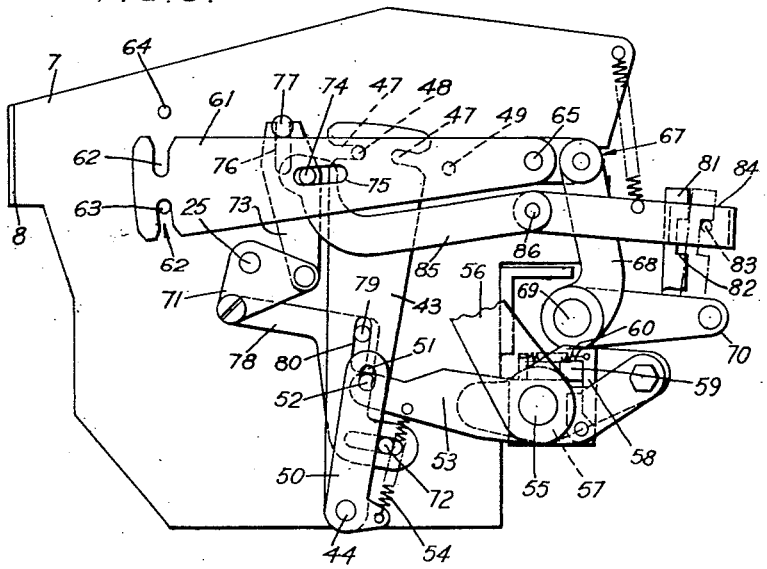
Figure 10:
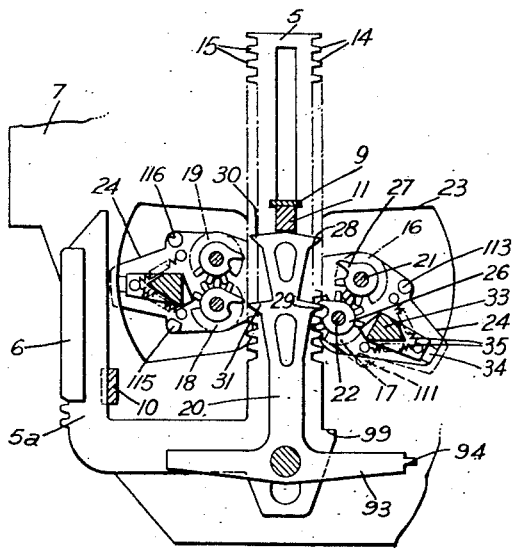

Fig. 6 is a view similar to that of Fig. 4 but with some parts omitted to show more clearly the parts that lie behind them, Fig. 7 is a section through the unit illustrated in Fig. 4, Fig. 8 is a view similar to that of Fig. 4 and illustrates the operating mechanism for gear changing, Figs. 9 and 10 respectively illustrate the sub-total gears in the positive and negative positions thereof, Fig. 11 is a view illustrating the method by which accumulator racks are guided for lengthwise movement, Fig. 12 is a section of line XII—XII, Fig. 11, and Fig. 13 is a perspective view illustrating the means by which a carry is effected between the highest and lowest denominational orders of the accumulator unit.

Referring to the drawings, the accumulators are supported for co-operation with type-carrying sectors 1, Fig. 1, rockable in known manner about the axis of a shaft 2, and controlled by stops 3 contained, as is usual, in a stop basket, not shown, and settable under control of perforated record cards. Also as is usual, the sectors 1 are fitted with toothed sectors 4 comprising toothed denominational members which, by co-operation with the accumulators, permit amounts to be registered in or read from the accumulators.

When an accumulator unit is attached to the machine each sector of a predetermined group of toothed sectors 4 is in permanent mesh with a toothed actuating member 5a forming part of the accumulator unit, one member 5a being provided for each denominational order of the unit and having a toothed rack 5 integral therewith. Each member 5a is fitted with shrouds 6, Figs. 1 and 3, which ensure that the teeth of the member 5a remain in mesh with its co-operating toothed sector 4.

An accumulator unit includes a pair of side plates 7, Fig. 4, having wings 8 by which the unit is fixed in position relative to the tabulator. Extending between the plates 7 and secured thereto are combs 9, 10, a block 11, and a slotted spindle 12, Figs. 7 and 11, all of which guide the racks 5 during lengthwise movement thereof, that is for vertical movement as viewed in the drawings, the racks 5 being slotted vertically for co-operation with the comb 9, block 11, and spindle 12 as shown in Fig. 7. Each toothed rack 5 has teeth 14, 15, Figs. 7, 9 and 10, on the opposite sides thereof for co-operation with toothed adding or subtraction sub-total register wheels 16, 17 or with toothed adding or subtraction grand-total register wheels 18, 19 when a set of register wheels is selected and moved into mesh therewith.

The sub-total and grand-total registers have carry pawls 20 which are common thereto, and which operate as described below, but otherwise the registers are of similar construction and this being so there will, for convenience, be described herein only the construction of the sub-total register.

From Fig. 7 it will be seen that the register wheels 16, 17, are supported by spindles 21, 22 on which the register wheels are freely rotatable and by which they are supported to be permanently in mesh with each other. The spindles 21, 22 extend through apertures 23 in the plates 7 and are fixed in a rocking carriage comprising carrier plates 24 which are pivotally mounted on studs 25, Figs. 4 and 6, extending outwards from the side plates 7. In the drawing it is assumed that the register wheels 16, 17 are decimal wheels each having ten teeth but it will be understood that if desired some of the wheels of the register may have denominational values other than decimal, for example one pair of wheels, that is an adding wheel and a subtraction wheel, may be duo-decimal to represent pence and another pair may be binary to represent tens-of-shillings if the register is a sterling register. A decimal or a duo-decimal wheel preferably has a single carry cam 26 movable therewith although if a wheel such as a binary wheel is employed the wheel may have a number of teeth which is a multiple of two and a carry cam for each such multiple. Each carry cam has a nose 27 to co-operate with the appropriate one of four cam faces, 28, 29, 30, 31, on the carry pawl 20 and each cam 26 is recessed as at 32, Fig. 7, to permit the cam noses 27 of a pair to pass each other.

Co-operating with the register wheels 17, and with the register wheels 18, is an aligner bar 33 supported at its opposite ends by the carrier plates 24 for movement lengthwise of slots 34 formed in the plates 24 and urged towards the lower gears of the pairs by springs 35. Movement of the aligner bar is controlled by cam plates 36, Figs. 4, 5 and 6, mounted at opposite ends of the unit to be freely pivoted on the studs 25. The aligner bar carries cam followers formed by rollers 37 engaging the cam plates 36, the rollers engaging the dwell in the cam plates, as shown in Fig. 6, when the bar is fully engaged in the teeth of the lower wheels of the meshing pairs and the cam plates are in their inactive central positions in which they are maintained by springs 38 located in openings 39 formed in the cam plates 36.

Secured to each cam plate 36 for angular movement therewith is a toothed quadrant 40 permanently in mesh with a toothed segment 41 freely pivoted on supports therefor formed by studs 42 extending for the side plates 7, Figs. 4 and 5. On each side of the accumulator unit is an operating member 43, Figs. 4, 6 and 8, pivotally mounted on a pin 44 extending from an operating block 45 slidable in a slot 46 in the side plate 7. The ends of the operating members opposite the pivots 44 therefore are provided with arcuate slots 47 for co-operation respectively with one or other of a pair of operating pins 48, 49 extending from and movable with the toothed segments 41, Figs. 4 and 6, and according as to whether the pin 48 or the pin 49 is engaged by a slot 47, on lengthwise movement of the operating members 43 the carrier plates 24 will be rocked about the pivots 25 therefor, through the medium of aligner bar 33 which at this time is engaged with the register wheels and is at the inner end of its slot 34, so that the set of wheels 16 or the set of wheels 17 will be moved from the inactive position thereof, Fig. 7, into meshing engagement with the teeth 14 of racks 5.

Lengthwise movement of the members 43 is effected by links 50 pivoted on the pins 44, Fig. 8, the links 50 being provided with slots 51 in which are located pins 52 secured to operating arms 53, the arms 53 being coupled to links 50 by springs 54 and freely mounted on the item shaft 55 of the tabulating machine, this shaft being rocked, in known manner by a rocker arm 56, once for each sensing cycle of the machine. Fixed to the shaft 55 is a block 57 on which is pivoted a latch 58 urged towards a latch pin 59 on operating arm 53 by a spring 60. When the shaft 55 is rocked, clockwise as viewed in Fig. 8, with the latch 58 engaging the latch pin 59 the operating arms 53 will also be rocked thereby to lift the operating members 43 and so rock the carrier plates 24 of the sub-total register so that one or other of the sets of wheels 16, 17, according as to which operating pin 48, 49 is engaged by a slot 47, is moved into mesh with the teeth 14 of the racks 5.

Rocking of the carrier plates 24 for the grand-total register is effected by a second pair of operating members 61, Figs. 4, 5 and 8, each having slots 62 to co-operate with one or other of a second pair of operating pins 63, 64 extending from and movable with the toothed segments 41, Fig. 6, for the grand-total register. The operating members 61 are pivoted on a shaft 65 which extends across the unit. Attached to the shaft 65 are blocks 66, Fig. 4, slidable in slots 67 in the side plates 7 on operation of links 68, Fig. 8, connecting the blocks 66 with a grand-total shaft 69, the shaft 69 being rocked, in known manner by a rocker arm 70 during a total-taking operation. When the operating members 61 are moved lengthwise the carrier plates 24 for the grand-total register are rocked about their pivots 25 and, according as to whether the pin 63 or the pin 64 is engaged by a slot 62, move either the set of wheels 18 or the set 19 into mesh with the teeth 15 of the racks 5.

The operating members 43 and 61 are coupled for simultaneous movement about their pivots 44, 65, the coupling device comprising, at each side of the unit, a bell-crank lever 71, Fig. 8, pivoted on the pivot 25 for the carrier plates 24 of the grant-total register, a link 73 having a pin 74 extending into a slot 75 in member 61 and a slot 76 engaging a groove in a stud 77 extending from the side plate 7, and a connecting member 78 also pivoted to the lever 71 and having a pin 79 extending into a slot 80 in the member 43. Member 78 when rocked is guided by a fixed pin 72. Accordingly, when one pair of members 43 or 61 is rocked about its pivots the other pair of members is simultaneously rocked so that at all times the sub-total and grand-total registers are each conditioned either for an adding or a subtraction operation.

Normally the operating members 43, 61 are conditioned, as shown in Fig. 8, for adding operations and the conditioning thereof for a subtraction operation is effected under card control by mechanism, not shown, which causes a link 81, Fig. 8, to move from the normal inactive position thereof, as indicated in full lines in Fig. 8, to the active position thereof, as indicated in dotted lines, in which a notch 82 in the link is disposed to cooperate with a pin 83 on a rocking lever comprising two arms 84, 85 secured to a common boss which is pivotally mounted on spindle 86 supported by the side plates 7. The arm 85 at its free end has a slot, not shown, formed therein which embraces the pin 74. After the link 81 has been moved to the active position thereof a cam, not shown, on the main shaft of the machine moves the link 81 downwards thus effecting rocking of members 43, 61 about their pivots 44, 65 and causing the members respectively to engage the pins 49, 64.

During adding or subtraction operations the appropriate set of adding or subtraction wheels 16, 17 are moved into mesh with the teeth 14 of racks 5 after the racks have been conditioned by the toothed sectors 4 on the type-carrying sectors 1. Thus as the type-carrying sectors are restored together with the racks 5 the amount set-up on the racks is transferred to the register wheels. If during the transfer of an amount from the racks 5 to the register a carry should occur the nose 27 of the appropriate carry cam 26 will engage the cam face 28 or 29 of its carry pawl 20, according as to whether an adding or a subtraction operation is being effected, and will rock the carry pawl 20, counter-clockwise as viewed in Fig. 7, about the spindle 12 on which the carry pawls are freely mounted. As can be seen from Fig. 7 the carry pawls are retained in the inactive positions thereof by centralising elements comprising opposed pins 87 supported for axial movement by plates 88, 89 secured to fixed bars 90 extending between the side plates 7. The pins 87 each have a shoulder 91 which is urged towards the plates 88 by a spring 92 and when the carry pawl is rocked from its inactive position it moves the appropriate one of the pins 87 axially against the action of its co-operating spring 92.

Each carry pawl 20 has a laterally extending carry control arm 93, Figs. 7 and 13, integral therewith at the extremity of which is a nose-piece 94 which, when the carry pawl is in the inactive position thereof, is engaged by a projection 95 extending laterally from a carry latch 96 freely pivoted on a spindle 97 supported by the side plates 7. The carry latch 96 carries a pin 98 engaging a shoulder 99 on the rack 5 appropriate thereto.

When a carry cam 26 effects rocking of its carry pawl 20 the nose-piece 94 is disengaged from its projection 95 and a spring 100 turns the carry latch 96 clockwise, as viewed in Fig. 7, until it is arrested by a fixed block 101. The pin 98 is thus moved upwards by a distance equal to the pitch of the teeth 14 thus permitting an additional upward movement of one tooth of the rack 5 of next higher denomination to register the carry on the register wheel co-operation therewith. It will be understood that in Fig. 7 the carry pawl 20 is not the pawl for the rack 5 shown therein but is the pawl for the rack 5 of next lower denomination. To accommodate the additional upward movement of the racks 5 to register carries the sectors 4, Fig. 1, when fully restored take up a position, as indicated in Fig. 1, with a clearance C which is equal to one tooth pitch.

At the beginning of a machine cycle the register wheels are disengaged from the racks 5 and are located in the inactive positions thereof as shown in Fig. 7 and as the sectors 4, Fig. 1, move forward to condition the racks 5 any carry latches 96 which were tripped during the preceding cycle are restored to the position thereof shown in Fig. 7. Restoring of the latches is effected by a restoring bar 102, Fig. 7, which is carried for swinging movement by arms 103, Fig. 4, secured to the opposite ends of the spindle 97. Rocking movement of the spindle 97, arms 103 and restoring bar 102 is effected by a rocker arm 104 also secured to the spindle 97 and operated by a link 105 from a cam, not shown, on the main shaft of the machine. During a restoring operation the restoring bar 102 is moved counter-clockwise, as viewed in Fig. 7, thus rocking the actuated carry latches 96 counter-clockwise until the pins 98 thereon engage their co-operating shoulders 99 and a clearance is effected between the projections 95 and their co-operating carry pawl nose-pieces 94 whereupon the springs 92 act to restore the actuated carry pawls to the inactive positions thereof as shown in Fig. 7 and on the return movement of the restoring bar 102 the projections 95 are again engaged with the nose-pieces 94. The restoration of the actuated carry latches 96 is completed before the toothed sectors 4 reach their fully forward positions.

To accommodate the well known fugitive one condition the carry pawl 20 of highest denomination is arranged to control the rack 5 of lowest denomination so that when the pawl 20 of highest denomination is actuated the rack 5 of lowest denomination is moved one tooth pitch to add thereto a unit digit. To this end the accumulator unit has a spindle 106, Figs. 7 and 13, journalled in the side plates 7 and to the spindle 106 are secured two arms 107, 108, Fig. 13, of which arm 108 is disposed immediately below the arm 93 of a dummy carry pawl 20a, Fig. 13, arranged to co-operate with a carry latch 96a for the rack of lowest denomination. The arms 107 and 108 are respectively connected to the carry pawls 20, 20a, Fig. 13, by links 109, 110. From Fig. 13 it will be seen that while there is a carry latch 96a co-operating with the carry pawl 20a there is no latch 96 for the carry pawl 20 of highest denomination. Accordingly, when the carry pawl of highest denomination is moved from the inactive position thereof it effects rocking of spindle 106, through link 109 and arm 107, and so displaces the projection 94 of the dummy carry pawl 20a co-operating with the carry latch 96a, as described above, permitting a unit digit to be added to the register wheel of lowest denomination.

The mode of operation of the accumulator unit will now be described, it first being assumed that adding operations are being performed during listing operations of the tabulator.

At the commencement of a listing operation the parts of the accumulator are all in the inactive positions thereof as shown in Fig. 7, except that some of the carry latches 96 and carry pawls 20 may be active. The type-carrying sectors 1 move forward, that is clockwise as viewed in Fig. 1, under control of springs, not shown, until they are arrested by the stops 3 of the stop basket the stops having been conditioned as the result of the sensing of a record card. During the forward movement of the sectors 1 any active carry latches 96 and carry pawls 20 are restored by the restoring bar 102 and springs 92 and the racks 5 are moved downwards, as viewed in Fig. 7, by the toothed sectors 4 carried by sectors 1. When the racks 5 have been conditioned the rocker arm 56, Fig. 8, rocks item shaft 55 and, through operating arms 53 and links 50, pushes upwards the operating members 43 thereby through operating pins 48 rocking the toothed segment 41 for the sub-total register. The segment 41 rocks the quadrant 40 with which it is in mesh and, through cam plates 36, rollers 37 and aligner bars 33 move the sub-total register wheels 16, 17 bodily about the axes of studs 25 until the wheels 16, the positive wheels, are meshed with the teeth 14 of racks 5 as shown in Fig. 9. When the wheels are fully meshed with the racks the carrier plates 24 are arrested by the engagement of stops 113 carried thereby with fixed stops 114, Fig. 4. The upward movement of members 43, however, is continued so that the cam plates 36 are turned about the axes of studs 25 to cause the aligner bar 33 to be withdrawn from the wheels 17, thus the aligner bar is not withdrawn until the wheels 16 have been fully meshed with the teeth 14 of racks 5.

During the return movement of sectors 1 and 4 the racks 5 are moved upwards thereby to the starting positions thereof and racks 5 accordingly rotate wheels 16 by the number of tooth pitches by which the racks 5 are moved to and from their starting positions except in instances where, as described above, carriers are effected. It will be understood that since the wheels 17 are permanently in mesh with wheels 16 they too will be rotated but in the opposite direction to that of wheels 16.

After the sectors 1 and 4 have been restored to the starting positions thereof the item shaft 55 is also restored and the downward movement of members 43 causes a reverse rocking movement of segments 41 and quadrants 40 to the starting positions thereof thereby to restore the wheels 16, 17 to the inactive positions thereof. However, during the first part of the angular movement of quadrants 40, the cam plates cause the aligner bar to be re-engaged with the wheels 17 and it is not until such re-engagement is fully effected that the wheels 16 are moved out of mesh with the teeth 14 of the racks 5.

If during a run of item cards the sensing device of the machine senses a control hole indicating that the amount recorded on the card is a negative amount necessitating a subtraction operation of the sub-total register, the link 81 Fig. 8, is operated, as described above, to cause co-operation of members 43 with operating pins 49. Thus on upward movement of members 43 by shaft 55 it is the wheels 17 which are meshed with teeth 14 of racks 5, as shown in Fig. 10, and on restoration of racks 5 the appropriate amount, through wheels 17, is subtracted from wheels 16 as these wheels are then rotated in the reverse direction to that by which adding operations are effected.

During a total taking operation the item shaft 55 is rocked prior to movement of the sectors 1 and 4 and racks 5 from the restored positions thereof so that, according as to which of the operating pins 48, 49, is engaged by the operating member 43, the adding or the subtraction wheels of the sub-total register are put into mesh with the teeth 14 of racks 5. Now on operation of sectors 1, 4 forward movement thereof is determined by the sub-total register wheels which are restored to the zero condition thereof. Just prior to the restoring movement of the sectors the appropriate grand-total register wheels are put into mesh with the teeth 15 of racks 5 by rocking of the grand-total shaft 69 and the zeroised sub-total registering wheels are disengaged from teeth 14. Thus during the restoring of the sectors and of racks 5 the amount read-off the sub-total register wheels is added to the grand-total registering wheels. The grand-total register wheels are disengaged from the racks 5 after the latter are restored to the starting positions thereof together with sectors 1 and 4.

When a grand-total is to be taken the sub-total is transferred to the grand-total register, as just described, and then by operation of the grand-total shaft 69 alone the appropriate set of grand-total wheels 18, 19 is meshed with the teeth 15 of racks 5 prior to the forward movement thereof together with sectors 1 and 4. Accordingly after a grand-total taking operation the sub-total and the grand-total wheels are restored to the zero condition thereof.

In all instances operation of the aligner bar is as described above, and to ensure such operation the carrier plates for the sub-total register, in addition to the stop pins 113, also carry stop pins 111, which pins 111 cooperate with fixed stop plates 112, Fig. 6, and the carrier plates for the grand-total register carry stop pins 115, 116 to co-operate respectively with fixed stop plates 117, 118.

From the foregoing it will be understood that accumulator mechanism according to the invention comprises as a single unit both a sub-total and a grand-total register each of which can perform adding or subtraction operations and for each denomination of the registers there is a carry pawl which is common to the sub-total and grand-total registers. Further, the construction of the accumulator mechanism is such that it can be arranged as compact independent units which can be juxtaposed to permit all sectors 1 of a tabulating machine to be under control of accumulator mechanism. To this end the units are arranged as illustrated in Fig. 2 so that the side plates 7 of one unit are disposed below and aligned with side plates of the units adjoining it on opposite sides thereof.

I claim:

1. Accumulator mechanism for record card controlled and other calculating machines, comprising racks having teeth along opposite sides thereof and each supported for lengthwise movement by co-operation with a toothed comb member, a sub-total register and a grand-total register engageable respectively with the opposite sides of the racks and each including for each rack a toothed adding wheel and a toothed subtraction wheel, spindles respectively common to the adding wheels and subtraction wheels of each register and by which the wheels are supported to be freely rotatable and permanently in mesh with each other, a rocking carriage supporting the spindles of each register normally to retain the wheels disengaged from the racks but to permit the adding or the subtraction wheels of the register to be moved into mesh with the racks, operating means co-operating with said carriages to determine whether the adding or the subtraction wheels of a register are to be meshed with the racks and selectively operable to move the selected wheels into mesh with the racks, a carry cam movable with each registering wheel, a denominational carry pawl common to the adding and subtraction wheels of both registers, said carry pawls being supported for rocking movement about a fixed axis, and including opposed centralising elements resiliently urging each pawl to the inactive position thereof, four cam faces on each carry pawl each such face being for engagement by a different carry cam to rock the pawl from the inactive to an active position thereof, a carry control arm movable with the carry pawl, a carry latch spring-urged to the active position thereof and retained in its inactive position by said carry control arm when the carry pawl is in the inactive position thereof, an abutment movable with said carry latch to co-operate with the rack of denomination next higher than that of the carry pawl controlling the carry latch and permitting an additional single tooth movement of the rack on movement of the carry latch from the inactive position thereof, and a restoring member common to all carry latches to restore the latches to the inactive positions thereof.

2. Accumulator mechanism according to claim 1, including a coupling device connecting the carry pawl of highest denomination with a dummy pawl co-operating with a carry latch for the rack of lowest denomination whereby on movement of the carry pawl of highest denomination to an active position thereof a unit digit is added to the rack of lowest denomination for entry into the register wheel meshed therewith.

3. Accumulator mechanism for record card controlled and other calculating machines, comprising toothed racks each supported for lengthwise movement by a toothed comb member, a sub-total register and a grand-total register each including for each rack a toothed adding wheel and a toothed subtraction wheel, spindles respectively common to the adding wheels and subtraction wheels of each register and by which the wheels are supported to be freely rotatable and permanently in mesh with each other, a rocking carriage supporting the spindles of each register normally to retain the wheels disengaged from the racks but to permit the adding or the subtraction wheels of the register to be moved into mesh with the racks, an aligner bar supported by each carriage for movement therewith to effect rocking thereof and for movement relative thereto to permit it to be engaged with and disengaged from a set of register wheels, cam followers supported at the opposite ends of the aligner bar, cam plates co-operating with said cam followers to move said aligner bar and the carriage therewith to engage said register wheels with the racks and thereafter to move said aligner bar relative to the carriage to disengage the aligner bar from the register wheels after meshing thereof with the racks and to engage the bar with the wheels prior to disengagement of the wheels from the racks, supports for said cam plates and about which the plates are freely rockable, a toothed quadrant movable with each said cam plate, a toothed segment permanently in mesh with each said quadrant, a segment support for each said segment and about which the segment is freely rockable, a pair of operating pins carried by each segment, an operating member for each segment selectively engageable with one or other of the operating pins carried by the segment thereby to determine the direction of rocking movement of the carriage, and operating blocks supporting the operating members for pivotal movement relative thereto selectively to engage the operating members with said operating pins and for movement therewith thereby through said segments, quadrants, cam plates and aligner bar to effect rocking movement of the carriage, and carry mechanism including a carry cam movable with a registering wheel and a carry pawl common to the adding and subtraction wheels of a denomination of both registers.

4. Accumulator mechanism according to claim 3, including a coupling device connecting the operating members for the sub-total register with those for the grand-total register whereby pivotal movement of the operating members for both registers is effected simultaneously to select for operation either the adding wheels or the subtraction wheels of each register.

5. Accumulator mechanism according to claim 4, including stop pins carried by each rocking carriage, and fixed stops to be engaged by a stop pin on complete meshing of a set of register wheels with said racks thereby to arrest movement of the carriage prior to the operating members reaching the end of their operative strokes during which a set of registers is engaged with the racks thereby to permit relative movement between said cam plates and cam followers to effect withdrawal of the aligner bar from engagement with the register wheels.

6. Accumulator mechanism according to claim 5, wherein the carry pawls are supported for rocking movement about a fixed axis, and including opposed centralising elements resiliently urging each pawl to the inactive position thereof, four cam faces on each carry pawl each such face being for engagement by a different carry cam to rock the pawl from the inactive to an active position thereof, a carry control arm movable with the carry pawl, a carry latch spring-urged to the active position thereof and retained in its inactive position by said carry control arm when the carry pawl is in the inactive position thereof, an abutment movable with said carry latch to cooperate with the rack of denomination next higher than that of the carry pawl controlling the carry latch and permitting an additional single tooth movement of the rack on movement of the carry latch from the inactive position thereof, and a restoring member common to all carry latches to restore the latches to the inactive positions thereof.

7. Accumulator mechanism according to claim 6, including a coupling device connecting the carry pawl of highest denomination with a dummy pawl co-operating with a carry latch for the rack of lowest denomination whereby on movement of the carry pawl of highest denomination to an active position thereof a unit digit is added to the rack of lowest denomination for entry into the register wheel meshed therewith.

References Cited in the file of this patent

UNITED STATES PATENTS

| 1,897,932 | Greve | Feb. 14, 1933 |
| 1,953,557 | Greve | Apr. 3, 1934 |
| 2,277,250 | Nyberg | Mar. 24, 1942 |
| 2,277,498 | Mehan | Mar. 24, 1942 |

FOREIGN PATENTS

| 681,028 | Great Britain | Oct. 15, 1952 |
| 1,051,559 | France | Sept. 16, 1953 |